(12) United States Patent
Kapoor et al.

(10) Patent No.: US 12,596,224 B2
(45) Date of Patent: Apr. 7, 2026

(54) MULTI-CLAD OPTICAL FIBERS

(71) Applicant: Sterlite Technologies Limited, Gurugram (IN)

(72) Inventors: Saurabh Kapoor, Gurugram (IN); Ranjith Balakrishnan, Gurugram (IN); Anand Pandey, Gurugram (IN)

( * ) Notice: Subject to any disclaimer, the term of this patent is extended or adjusted under 35 U.S.C. 154(b) by 308 days.

(21) Appl. No.: 18/185,685

(22) Filed: Mar. 17, 2023

(65) Prior Publication Data
US 2023/0305224 A1      Sep. 28, 2023

(30) Foreign Application Priority Data
Mar. 26, 2022    (IN) .............................. 202211017573

(51) Int. Cl.
*G02B 6/036*          (2006.01)
*G02B 6/02*          (2006.01)

(52) U.S. Cl.
CPC ..... *G02B 6/03694* (2013.01); *G02B 6/02042* (2013.01); *G02B 6/02338* (2013.01)

(58) Field of Classification Search
None
See application file for complete search history.

(56) References Cited

U.S. PATENT DOCUMENTS

| | | | | |
|---|---|---|---|---|
| 2006/0115913 A1 * | 6/2006 | Orita ................. | G02B 6/02395 | |
| | | | 438/22 | |
| 2011/0286710 A1 * | 11/2011 | De Montmorillon ....................... | | |
| | | | C03B 37/018 | |
| | | | 385/124 | |

FOREIGN PATENT DOCUMENTS

| | | | | | |
|---|---|---|---|---|---|
| CN | 103760634 A | * | 4/2014 | | |
| CN | 104898200 A | * | 9/2015 | ........... | C03C 13/045 |
| CN | 107522396 A | * | 12/2017 | ......... | C03B 37/0235 |
| CN | 107193080 B | * | 5/2020 | ......... | G02B 6/0288 |
| CN | 113848608 A | * | 12/2021 | ......... | G02B 6/02009 |
| EP | 1813973 A1 | * | 8/2007 | ........... | G02B 6/028 |
| EP | 3316010 B1 | * | 4/2022 | ........... | C03C 13/045 |
| JP | 6615905 B2 | * | 12/2019 | ........... | C03C 13/045 |

* cited by examiner

*Primary Examiner* — Chris H Chu
(74) *Attorney, Agent, or Firm* — Steven R. Fairchild

(57)          ABSTRACT
The present invention relates to an optical fiber (100, 200, 300, 400) comprising one or more cores (102), a clad enveloping the one or more cores and a buffer clad layer (202, 302, 402) between the first clad layer and the second clad layer. Particularly, the clad includes a first clad layer (104) is made of silica with less than 0.1% metallic impurity and a second clad layer (106) is made of silica with greater than 0.1% of metallic impurity. Further, the first clad layer has less than 800 ppm OH content, less than 10 ppm aluminium and less than 2 ppm sodium and the second clad layer has less than 50 ppm OH content, more than 10 ppm aluminium and more than 2 ppm sodium.

12 Claims, 4 Drawing Sheets

200

106
202
104
102

MULTI-CLAD OPTICAL FIBERS

CROSS-REFERENCE TO RELATED APPLICATIONS

This application claims the benefit of Indian Application No. 202211017573, titled MULTI-CLAD OPTICAL FIBERS" filed by the applicant on Mar. 26, 2023, which is incorporated herein by reference in its entirety.

FIELD OF THE INVENTION

Embodiments of the present disclosure relate to the field of optical fiber communications, and more particularly to a multi-clad optical fiber suitable for transmission of high-power light and the like, and an optical fiber module, a fiber laser, and a fiber amplifier having the optical fiber.

DESCRIPTION OF THE RELATED ART

The fields of data communications and telecommunications, optical fibers with small diameters are attracting attention as optical fibers that realize dense optical fiber cables. An optical fiber with a small diameter is in general an optical fiber in which a portion made of glass has a small diameter and the cladding diameter is small. Note that optical fibers with small diameters also include one whose outer circumference with a coating, formed such that the coating covers the outer circumference of a cladding, included is small because the cladding diameter is small.

Optical fiber cables have secured an important position in building the optical network of modern communication systems across the globe. An optical fiber cable consists of one or more optical fibers that use light to transfer information from one end of the one or more optical fibers to other. The one or more optical fibers are made by optical fiber preforms which are manufactured by depositing layers of specially formulated silicon dioxide using chemical vapor deposition (CVD) processes, such as outside vapor deposition (OVD) and vapor axial deposition (VAD) processes. Such processes often utilize only a portion of a starting raw material due to limitations in deposition efficiency of the deposition processes. A lower deposition efficiency for the deposition processes leads to wastage of generated silica soot. Thus, resulting in significant increase in raw material cost. Some of the prior art references are given below:

Prior art U.S. Pat. No. 5,076,825A teaches about preform having three-layer construction, wherein a support layer made of a silica glass having a drawable temperature of at least 1800° C. In order to eliminate the problem that the cores of some adjacent optical fibers come into direct contact with each other i.e. to avoid sticking of cores of optical fiber.

Another prior art U.S. Pat. No. 5,090,979A discloses a manufacturing process for an optical fiber preform whose cladding layer is doped in order to prevent loss of useful light from the optical fiber without reducing range of light wavelength over which the fiber provides effective transmission.

Yet another prior art US20030026584A1 discloses an optical fiber having cladding made of nanoparticles in order to bear mechanical stresses and is hydrophobic in nature.

While the prior arts cover various solutions for the aforesaid drawbacks related to material wastage and high production cost. However, there still remains a need of material that can be used for producing the optical fiber preforms and incurs low cost without reducing function, performance and quality of the optical fiber preforms. In light of the above-stated discussion, there is a need to provide a technical solution that overcomes the aforementioned problems of the traditional optical fibers.

SUMMARY OF THE INVENTION

Embodiments of the present invention relates to an optical fiber comprising: one or more cores and a clad enveloping the one or more cores. The clad further comprises at least two clad layers where the first clad layer is made of silica with less than 0.1% metallic impurity, and a second clad layer of the at least two clad layers is made of silica with greater than 0.1% metallic impurity.

In accordance with an embodiment of the present invention, the core is either based of pure silica or of germanium doped silica. Moreover, the first clad layer and second clad have OH content of less than 5 ppm.

In accordance with an embodiment of the present invention, the optical fiber comprises a buffer clad layer between the first clad layer and the second clad layer. The first clad layer has a radius in a range of 10-20 microns. The first clad layer has less than 800 ppm OH content, less than 10 ppm aluminium and less than 2 ppm sodium.

In accordance with an embodiment of the present invention, the second clad layer has less than 50 ppm OH content, more than 10 ppm aluminium and more than 2 ppm sodium.

In accordance with an embodiment of the present invention, the at least two clad layers comprise the first clad layer and the second clad layer. The first clad layer surrounds one or more cores and the second clad layer surrounds the first clad layer. In particular, the first clad layer and the second clad layer are defined by a first purity level of silica and a second purity level of silica. Moreover, the first purity level is higher than the second purity level. Further, the first clad layer is made of type 3 silica and the second clad layer is made of type 1 silica or type 2 silica.

The foregoing objectives of the present invention are attained by employing a method of manufacturing a strength member for optical fiber cables.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

Figure 1:
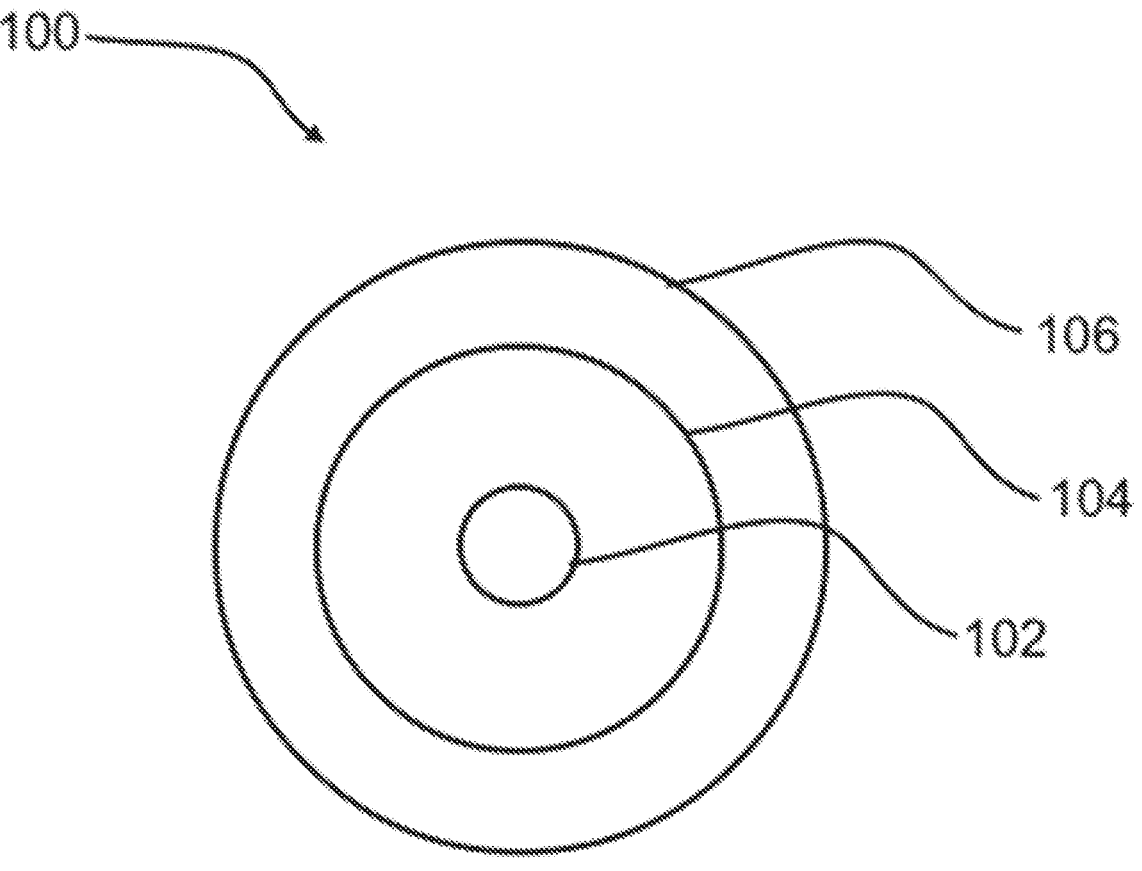
FIG. 1 is a pictorial snapshot illustrating a multi-clad optical fiber in accordance with an embodiment of the present invention.

The multi-clad optical fiber is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

The principles of the present invention and their advantages are best understood by referring to FIG. 1 to FIG. 4. In the following detailed description, numerous specific details are set forth in order to provide a thorough understanding of the embodiment of the invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well-known methods, procedures, and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

An optical fiber refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or a multi-core or other suitable category. The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis. The optical fiber may be a bend insensitive fiber that has less degradation in optical properties or less increment in optical attenuation during multiple winding/unwinding operations of an optical fiber cable.

The term "core" of an optical fiber as used herein is referred to as the innermost cylindrical structure present in the center of the optical fiber, that is configured to guide the light rays inside the optical fiber.

The term "cladding" of an optical fiber as used herein is referred to as one or more layered structure covering the core of an optical fiber from the outside, that is configured to possess a lower refractive index than the refractive index of the core to facilitate total internal reflection of light rays inside the optical fiber.

Terms multi-clad optical fibers and optical fibers are used interchangeably throughout the draft.

Figure 2:
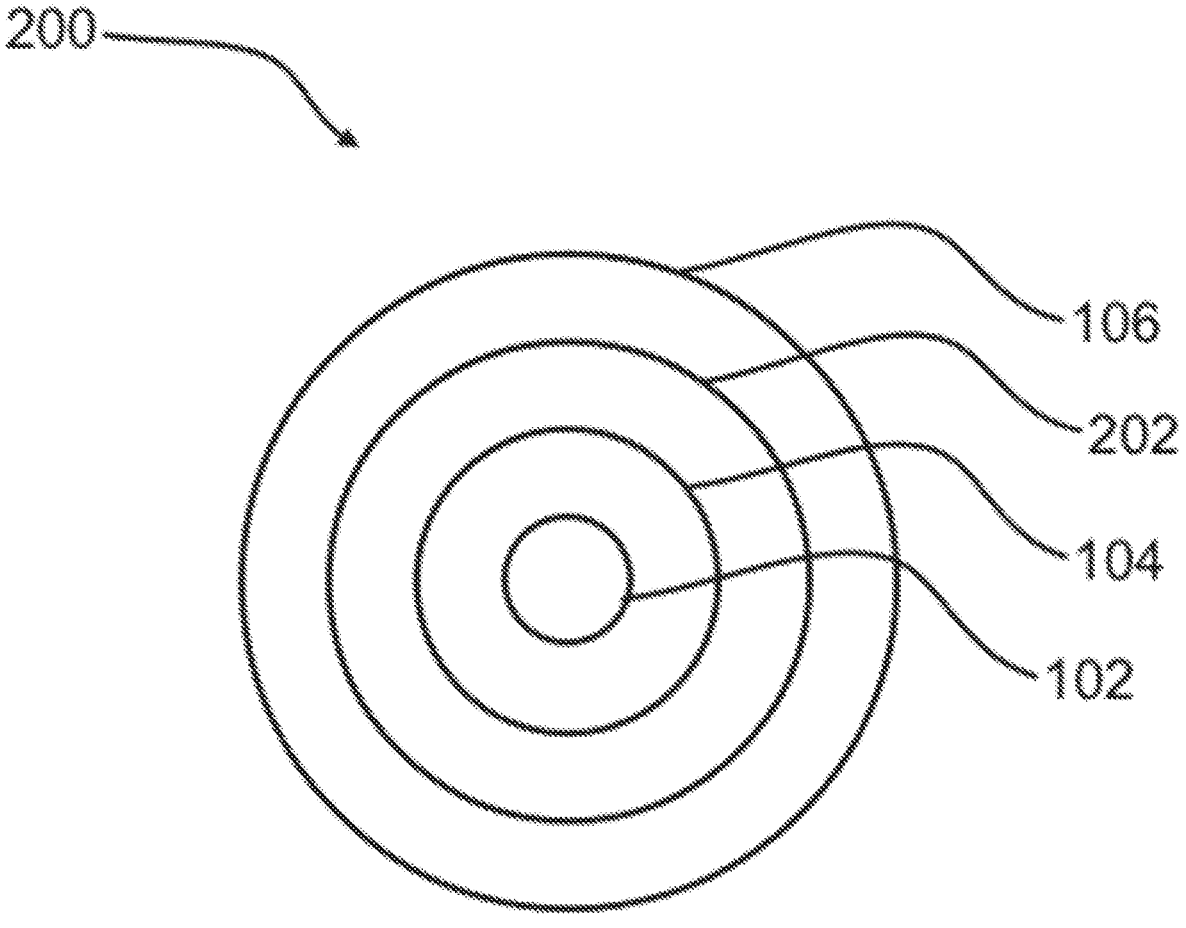
FIG. 2 is a pictorial snapshot illustrating a multi-clad optical fiber in accordance with another embodiment of the present invention.
Figure 3:
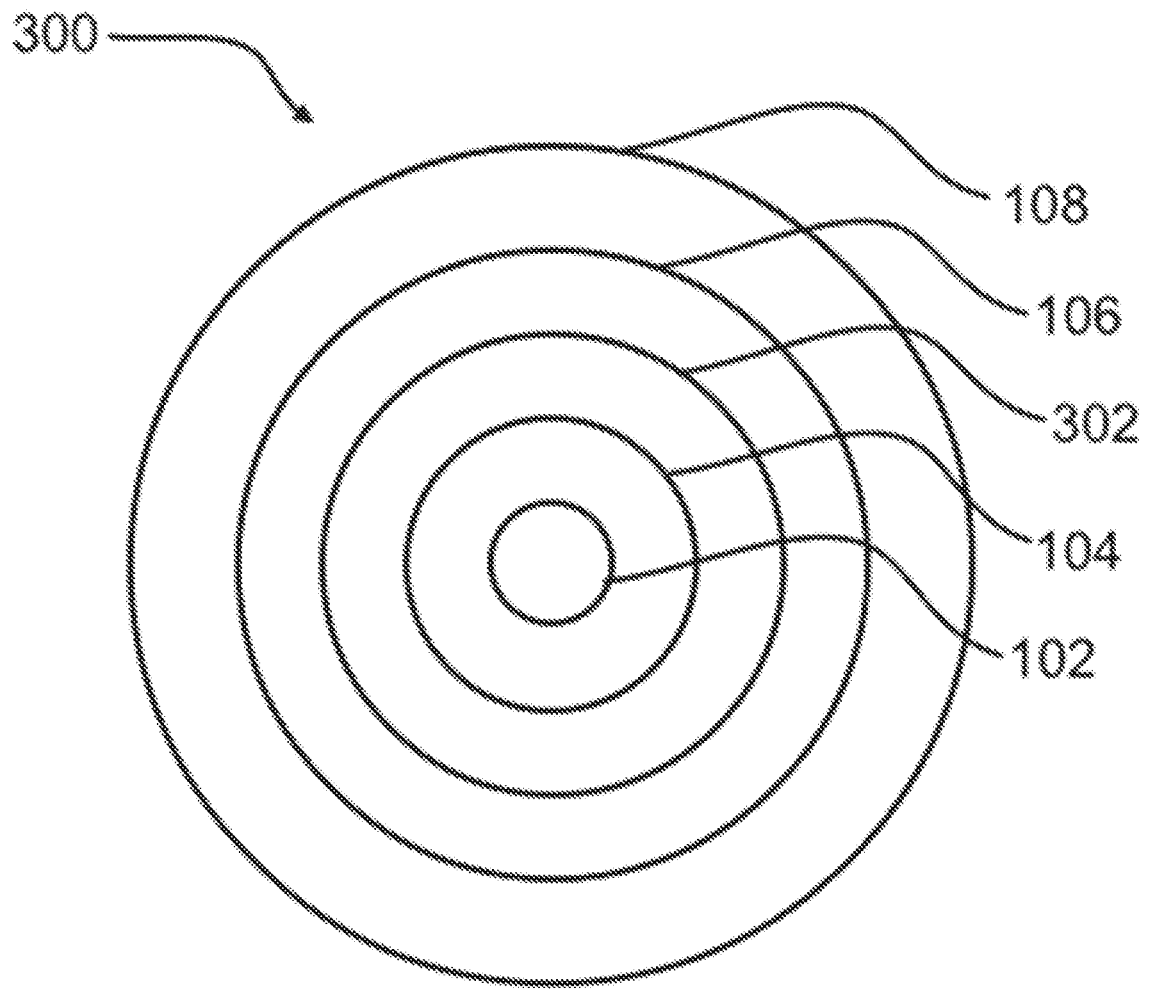
FIG. 3 is a pictorial snapshot illustrating a multi-clad optical fiber in accordance with yet another embodiment of the present invention.
Figure 4:
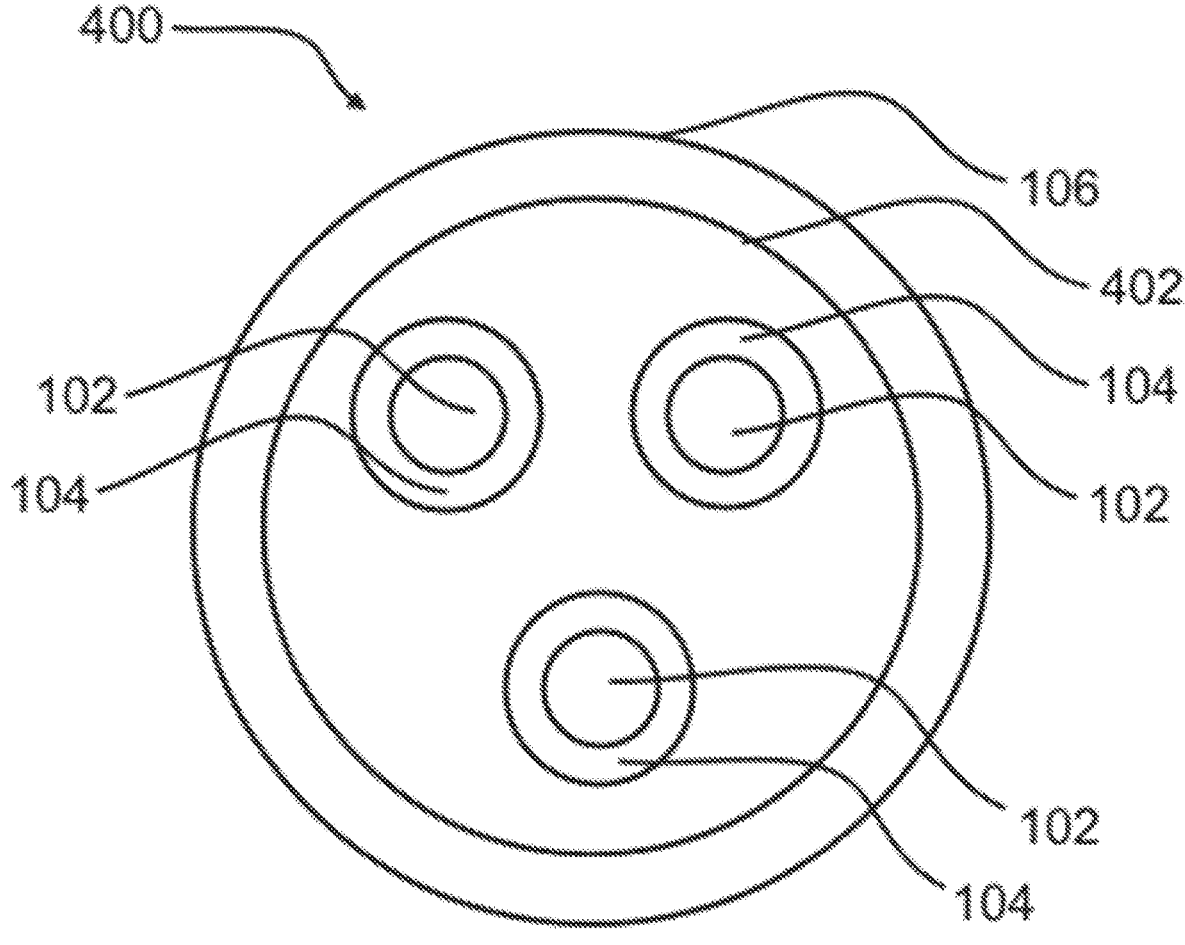
FIG. 4 is a pictorial snapshot illustrating a multi-clad optical fiber in accordance with yet another embodiment of the present invention.

FIG. 1-4 are pictorial snapshots illustrating a multi-clad optical fiber in accordance with one or more embodiments of the present invention. The optical fiber 100, 200, 300, 400 may comprise one or more cores 102 and a clad enveloping the one or more cores 102. In particular, the one or more cores 102 are a light-carrying portion of the optical fiber 100, 200, 300, 400 using total internal reflection. Embodiments of the optical fiber represented in FIG. 1, FIG. 2 and FIG. 3 illustrates a single core 102 having a plurality of clad represented by 104, 106, 108 and so on surrounding the core 102. And FIG. 4 there are plurality of cores represented by 102 having plurality of clad 104 and 106 surrounding the core 102.

Now simultaneously referring to FIG. 1-4. The clad may comprise at least two clad layers 104, 106, 108 i.e., a first clad layer 104, a second clad layer 106 and a third clad layer 108. In particular, the first clad layer 104 may surround one or more cores 102, the second clad layer 106 may surround the first clad layer 104 and the third clad layer 108 may surround the second clad layer 106. Further, it may be noted that the optical fiber 100, 200, 300, 400 may comprise more than three clad layers or less than three clad layers.

In accordance with an embodiment of the present invention, the first clad layer 104 of the at least two clad layers may be made of silica with less than 0.1% metallic impurity. And the second clad layer 106 of the at least two clad layers may be made of silica with greater than 0.1% metallic impurity.

In accordance with an embodiment of the present invention, the first clad layer 104 may be made of type 3 or type 4 silica, the second clad layer 106 may be made of type 1 silica or type 2 silica, the third clad layer 108 may be composed of type 1 silica or type 2 silica or type 3 silica or any combination of type 1 silica, type 2 silica, type 3 and type 4 silica. Further, the type 1 silica or silica glasses may be produced from natural quartz by electric fusion under vacuum or under an inert gas atmosphere. The type 2 silica or silica glasses may be produced from quartz crystal powder by flame fusion (Verneuil process). The type 3 silica or silica glasses may be synthetic vitreous silicas produced by hydrolyzation of $SiCl_4$ (Silicon tetrachloride) when spraying into an oxygen-hydrogen flame. The type 3 silica or silica glass may be synthetic clear silica glass made by pyrolysis of $SiCl_4$ vapors blown into a plasma burner flame in the presence of oxygen.

In accordance with an embodiment of the present invention, the core is either based of pure silica or of germanium doped silica wherein the content of OH has to be maintained at less than 1 ppm. Further, the first clad layer which surrounds the core and the second clad layer which surrounds the first clad layer has OH content below 5 ppm. The first clad layer is 10-20 microns in radius.

In accordance with an embodiment of the present invention, the first clad layer 104 and the second clad layer 106 may be defined by a first purity level of silica and a second purity level of silica respectively. Further, the first purity level is higher than the second purity level.

In accordance with an embodiment of the present invention, the first clad layer 104 may have less than 800 ppm OH content, less than 10 ppm aluminium and less than 5 ppm sodium. The second clad layer 106 may have less than 50 ppm OH content, more than 1 ppm aluminium and more than 2 ppm sodium. Alternatively, the amount of OH content, aluminium and sodium in the first clad layer 104 and the second clad layer 106 may vary. Alternatively, other metallic impurities except aluminium and sodium may be used.

In accordance with an embodiment of the present invention, due to the presence of OH content or group, the optical fiber 100, 200, 300, 400 remains dry so as to prevent signal deterioration as presence of moisture may cause attenuation or other adverse phenomena related to signal loss.

In accordance with an embodiment of the present invention, electron probe micro-analyzer (EPMA) and laser ablated ICP and Atomic absorption spectroscopy and Fourier transform infrared spectroscopy (FTIR) are techniques for the elemental analysis and quantification of the impurities present in the glass used for making optical fiber and thereby differentiating the different types of silica. This further helps in determining the type of silica to be used in an optical fiber as either a combination or individual for inner and outer clad.

In accordance with an embodiment of the present invention, the optical fiber may further comprise a buffer clad layer 202, 302, 402 between the first clad layer 104 and the second clad layer 106. Further, the buffer clad layer 202, 302, 402 may be composed of pure silica.

Advantageously, multi-clad optical fibers manufactured by optical fiber preforms formed using a material that incurs low cost without reducing function, performance and quality of the optical fiber preforms, wherein the material is a combination of type 1, type 2, type 3 and type 4 silica forming optical fiber preform claddings. Further, due to the combination of silica clad layers and a reduced coating layer in the optical fiber 100, 200, 300, 400, wastage of soot is significantly reduced, thereby significant reduction in production cost of the optical fiber 100, 200, 300 400.

The foregoing descriptions of specific embodiments of the present technology have been presented for the purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

In a case that no conflict occurs, the embodiments in the present disclosure and the features in the embodiments may be mutually combined. The foregoing descriptions are merely specific implementations of the present disclosure but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed for:

1. An optical fiber (100, 200, 300, 400) comprising:
one or more cores (102), wherein the one or more cores (102) are made of germanium doped silica; and
a clad enveloping the one or more cores (102), wherein the clad comprising at least two clad layers (104, 106), wherein a first clad layer (104) of the at least two clad layers (104, 106) is made of silica with less than 0.1% metallic impurity by mass, and a second clad layer (106) of the at least two clad layers (104,106) is made of silica with greater than 0.1% metallic impurity by mass,
wherein the second clad layer (106) surrounds the first clad layer (104),
wherein the first clad layer (104) is composed of type 3 silica or type 4 silica, and the second clad layer (106) is composed of type 1 silica or type 2 silica wherein a buffer clad layer composed of pure silica is present between the first clad layer (104) and the second clad layer (106) such that the first clad layer (104) has a radius between 10 to 20 microns, aluminum less than 10 ppm, and sodium less than 2 ppm.

2. The optical fiber (100, 200, 300, 400) as claimed in claim 1, wherein the core (102) has less than 1 ppm OH content.

3. The optical fiber (100, 200, 300, 400) as claimed in claim 1, wherein the first clad layer (104) and second clad (106) has OH content of less than 5 ppm.

4. The optical fiber (100, 200, 300, 400) as claimed in claim 1, wherein the first clad layer (104) has less than 800 ppm OH content.

5. The optical fiber (100, 200,300,400) as claimed in claim 1, wherein the second clad layer (106) has less than 50 ppm OH content.

6. The optical fiber (100, 200,300,400) as claimed in claim 1, wherein the second clad layer (106) has more than 10 ppm aluminum.

7. The optical fiber (100, 200,300,400) as claimed in claim 1, wherein the second clad layer (106) has more than 2 ppm sodium.

8. The optical fiber (100, 200, 300, 400) as claimed in claim 1, wherein the at least two clad layers comprise the first clad layer (104) and the second clad layer (106).

9. The optical fiber (100, 200, 300, 400) as claimed in claim 8, wherein the first clad layer (104) surrounds the one or more cores (102).

10. The optical fiber (100, 200, 300, 400) as claimed in claim 1, wherein the first clad layer (104) is defined by a first purity level of silica.

11. The optical fiber (100,200,300,400) as claimed in claim 1, wherein the second clad layer (106) is defined by a second purity level of silica.

12. The optical fiber (100, 200, 300, 400) as claimed in claim 1, wherein the first purity level is higher than the second purity level.

* * * * *